United States Patent
Scarpin et al.

(10) Patent No.: US 10,484,306 B2
(45) Date of Patent: Nov. 19, 2019

(54) SYSTEM FOR IDENTIFICATION OF THE PAIRS OF PORTS AND OF THE RESPECTIVE PATCH CORDS IN PATCH PANELS OF TELECOMMUNICATION NETWORKS

(71) Applicant: FURUKAWA ELECTRIC LATAM S.A., Curitiba (BR)

(72) Inventors: Sergio Roberto Scarpin, Curitiba (BR); Francisco Da Silva Tavares, Curitiba (BR); Cinthya Oestreich Silva, Curitiba (BR); Guilherme Bauml Campagnoli, Curitiba (BR); Matheus Kulcheski Carneiro, Curitiba (BR); Adriel Erich Pereira, Campinas (BR); Carlos Alberto Fernandes Sobrinho, Campinas (BR); André Luís De Castro Mello, Campinas (BR)

(73) Assignee: FURUKAWA ELECTRIC LATAM S.A., São Paulo (BR)

( * ) Notice: Subject to any disclaimer, the term of this patent is extended or adjusted under 35 U.S.C. 154(b) by 0 days.

(21) Appl. No.: 16/156,713

(22) Filed: Oct. 10, 2018

(65) Prior Publication Data

US 2019/0109801 A1    Apr. 11, 2019

(51) Int. Cl.
*G08B 5/36* (2006.01)
*H02B 15/00* (2006.01)
*H04L 12/931* (2013.01)

(52) U.S. Cl.
CPC .............. *H04L 49/405* (2013.01); *G08B 5/36* (2013.01)

(58) Field of Classification Search
CPC ..................................................... H04L 49/405
See application file for complete search history.

(56) References Cited

U.S. PATENT DOCUMENTS

| | | | |
|---|---|---|---|
| 6,285,293 B1 | 9/2001 | German et al. | |
| 7,605,707 B2 | 10/2009 | German et al. | |
| 8,171,468 B2 | 5/2012 | Larsson et al. | |
| 8,427,335 B2 | 4/2013 | Caveney et al. | |
| 8,665,107 B2 | 3/2014 | Caveney et al. | |
| 2007/0243725 A1* | 10/2007 | Nordin | H04Q 1/136 439/49 |
| 2009/0178119 A1* | 7/2009 | Macauley | H04L 12/467 726/4 |

(Continued)

*Primary Examiner* — Joseph H Feild
*Assistant Examiner* — Pameshanand Mahase
(74) *Attorney, Agent, or Firm* — Dinsmore & Shohl LLP; Mark D. Schneider; Cesare Sclafani (57) ABSTRACT

A system applied to patch panels having pairs of ports to be interconnected by the insertion of connectors provided at each end of a patch cord and carrying a passive NFC identification tag and containing a unique identity of the patch cord. A tracking module associated to each patch panel and connected to a controller device and comprising an NFC antenna associated with each panel port and a reader for processing and storing the signals that each antenna picks up from the identification tag of a connector inserted in the respective panel port. Each tracking module carries a light indicator, indicating the connection status of each port, and a button for registering the patch panel in the controller device having its operation managed, in accordance with a programmed interconnection layout, by a server.

20 Claims, 7 Drawing Sheets

(56) References Cited

U.S. PATENT DOCUMENTS

| | | | |
|---|---|---|---|
| 2011/0043371 A1* | 2/2011 | German | H04Q 1/136 340/815.45 |
| 2013/0078848 A1* | 3/2013 | Kummetz | H04Q 1/138 439/488 |
| 2017/0034597 A1* | 2/2017 | Shih | H04Q 1/136 |

* cited by examiner

SYSTEM FOR IDENTIFICATION OF THE PAIRS OF PORTS AND OF THE RESPECTIVE PATCH CORDS IN PATCH PANELS OF TELECOMMUNICATION NETWORKS

CROSS-REFERENCE TO RELATED APPLICATIONS

This application claims priority to Brazilian Patent Application No. 1020170218686 filed Oct. 10, 2017, which is incorporated herein by reference in its entirety including the specification, drawings, and abstract.

TECHNICAL FIELD

The present disclosure relates to a system for enabling individual identification of each pair of ports of patch panels of telecommunication networks and also of their respective patch cords when connecting the two ports of each pair of ports of said patch panels, which are used to allow the organized interconnection of different digital or analogue data telecommunication lines in different applications.

BACKGROUND

The telecommunication network patch panel installations are well known in the prior art with said patch panels comprising in their front region a plurality of panel ports to be interconnected, two by two, in a previously designed manner, by a patch cord having at each end a connector to be inserted and retained in a respective port of a pair of panel ports, a port being connected, by the rear region of the panel, to a line telecommunication, for example a connection to a network switch, router or PBX, while the other port of the pair is connected, also by the back region of the panel, to another telecommunication line, for example a local network point or socket where it will be connected to a computer, telephone, printer, server, or other equipment. The patch cord thus enables the organized connection of each pair of panel ports, that is, of each two lines of telecommunication in an arrangement which can be rearranged, at any time, according to the variable operational requirements of each installation.

In this type of installation of telecommunication network patch panels, it is common to change the arrangement of the interconnections between the different telecommunication lines connected to the panel ports, requiring the operator to carefully note the ports to have their interconnection performed by a respective patch cord.

In installations with a large number of patch panels and panel ports, the operator in charge of deploying or rearranging the interconnections is required to expend effort and time to overcome the usual difficulties in safely locating the panel ports to have their interconnection effected or rearranged, and there is an effective risk of interconnection errors that will also require efforts to detect and correct them, particularly in installations with a high number of telecommunication lines to have their interconnections effected, complemented or rearranged.

Due to the inconveniences of the operations of effecting, complementing and rearranging interconnections between the panel ports, made by manual annotations to be followed by the operators, computerized systems were proposed for tracking and individual identification of the interconnection of each two patch panel ports, through a patch cord. In such an interconnection system, each of the opposing ends of each patch cord carries a connector on which is secured an identification tag containing the data for the individual identification of each patch cord to be applied to the patch panels which are usually mounted in a structure disposed in an enclosure, for example a room, generally restricted access.

In such installations, the patch panels have each panel port operatively associated with a sensor capable of reading the data contained in the identification tag of the connector that is inserted in a respective port of the patch panel. A controller device is operatively associated with the patch panels to identify/track whether certain patch cords are with their connectors connected to the port pairs of the patch panels, in accordance with the desired arrangement.

A known identification system is that disclosed in U.S. Pat. No. 7,605,707 in which it is proposed to use an RF antenna associated with each panel port and still to an RFID reader device. Each connector carries an RFID identification tag with a microchip containing the unique identity data of a respective patch cord and to be detected by the RF antenna of a panel port when a respective connector is inserted or removed from said panel port. The signals detected by the RF antenna are then transmitted to the reader device provided with a processor which transforms the RF antenna signals into digital data to be stored in a database of a computerized controller device, which registers the connection condition of the patch cord, allowing the identification of each two panel ports that are interconnected by the same patch cord or that have been disconnected from each other.

This prior solution also provides light indicators, in the form of LEDs, associated with each panel port, to indicate, by the actuation of the controller device, that the respective panel port has inserted therein or removed therefrom an end connector of a respective patch cord.

Although providing a computerized identification tracking of the different interconnections of the pairs of ports in a patch panel installation, this prior solution presents, as an inconvenience, the requirement to communicate on radio frequencies from 868 MHz to 950 MHz, or in the 2.4 GHz band. Said frequencies are quite high and make complex the circuits and components needed to conduct, switch and read the signals, leading to a fairly high cost solution. Another disadvantage of these levels of frequency is the fact that there is no global standardization for them, so that each country or region (USA, Europe, Japan, and others) has different requirements and therefore the solution needs to be adapted locally.

Another known solution is described in U.S. Pat. No. 6,285,293, in which it is proposed to use tracking modules to be attached to each patch panel, each tracking module carrying, associated with each port of the respective patch panel, a light indicator (LED), a sensor, usually mechanical, and a tracker button, connected to a controller device. In this previous solution, the detection of the insertion of a connector in a port is defined by the actuation of the respective sensor. The detection of a connection or a disconnection is made by the actuation of the respective sensor that does not constitute an antenna and the end connectors of the patch cords do not carry any identification tag.

Further according to this foregoing solution, the pressing of a respective tracker button associated with each panel port causes the lighting of the light indicator associated with that button and the controller device locates the opposite end of the respective patch cord and energizes the light indicator (LED) associated with the receiving port on the opposite end of the same patch cord.

Although providing a computerized identification tracking of the different port pairs interconnections in a patch panel installation, this second prior solution presents, as an inconvenience, the fact that the tracking module carries a sensor generally mechanical, and a tracker button for each patch panel port, making each tracking module more complex and less compact, as well as making the connectors (male and/or female) no longer follow the pattern in order to accommodate those keys.

Another drawback arises from the fact that there is no unique identifier on the patch cord (the system only detects the presence or absence but does not identify the element) so the system needs to assume that any two connections detected consecutively correspond to a patch cord. The consistency of the database heavily depends on the training and the discipline of the operator to execute the connections in that specific way. If this does not happen, or if there are different delays between the panel controllers to route detections to the server, the database will be inconsistent and the system will lose its utility.

Other identification systems using RFID may be seen in patent documents U.S. Pat. Nos. 8,665,107; 8,427,335; and 8,171,468, which have at least some of the drawbacks discussed above.

Still other systems are known such as that one in which an additional path is used to the patch cord and through which the data travels between the patch panels; that one in which the smart solution is made by contacting a chip fixed to the patch cord with its reader in the patch panel; or yet one in which the patch panel recognizes the presence of the patch cord by approximation, using optical or infrared sensor technology.

These known solutions either do not allow the inclusion of customized information on the patch cord or do not prevent misidentification of patch cords, due to the possibility of the optical or infrared sensors to detect any element that is close to a port or even being cheated by a reflexive surface (e.g. the acrylic cover of an equipment installed below the patch panel), or require connecting elements which do not follow the industry standard, or complex circuits that have too high costs.

SUMMARY

In view of the above drawbacks, the present disclosure aims to provide a computerized system to allow the easy and safe visual and individual identification not only of each pair of patch panel ports already installed or to be installed for application in the interconnection of telecommunication networks according to an appropriate arrangement, as well as of the respective patch cords when connecting the respective two ports of each pair of ports of these patch panels, using reduced power and low frequency for wireless communication between each patch cord and the panel ports, indicating and identifying the connection or disconnection of the ports of each pair of ports.

A further object of the present disclosure is to provide an identification system as set forth above and allowing a simple and rapid insertion of data into the identification tags already attached to the respective end connectors of a patch cord with the latter already interconnecting two panel ports. With this feature, it is possible, for example, to control the useful life of the patch cord, which usually has a maximum number of connections/disconnections before it begins to have its performance degraded.

These and other objects and advantages of the present disclosure are achieved by the provision of a tag and reader system based on Near Field Communication (NFC) in accordance with ISO/IEC 14443, which are positioned externally to the connection elements that, in this way, can continue to follow exactly the compatibility standards of the industry.

According to the present disclosure, each patch panel is provided with a tracking module where there are active detection circuits and switching and reading circuits of the passive NFC tags, which in turn are attached to the patch cords.

The antennas and circuits, of each tracking module of the patch panel, are carefully designed and tuned to detect connections in a limited three-dimensional space, avoiding false detection of connections that are actually on neighboring ports. By using the relatively low frequencies of the NFC standard, all the switching and reading circuit can be executed in printed circuit board presenting a relatively simple construction and therefore accessible costs. The frequencies used in the NFC have the important additional advantage of being globally standardized, so that the same tags and readers can be used anywhere in the world without any change. According to the above system, after the connectors of the patch cord have been connected to respective front ports, the scanning of the ports in progress by the panel module will detect this new connection and communicate the unique identifier of that patch cord to a controller device of the panels which will maintain a local database of connections, and will also forward those events to the software of a centralized server that maintains the entire network database and provides an administration interface. In addition to the connection detection, the system allows only the connector and its patch cord to be identified, so that the connection database will always be consistent regardless of the sequence of operations performed by the operator in the field.

BRIEF DESCRIPTION OF THE DRAWINGS

The present disclosure will now be disclosed with reference to the accompanying drawings, given by way of example of a possible embodiment of the present disclosure and in which.

DESCRIPTION OF THE EMBODIMENTS

Figure 1:
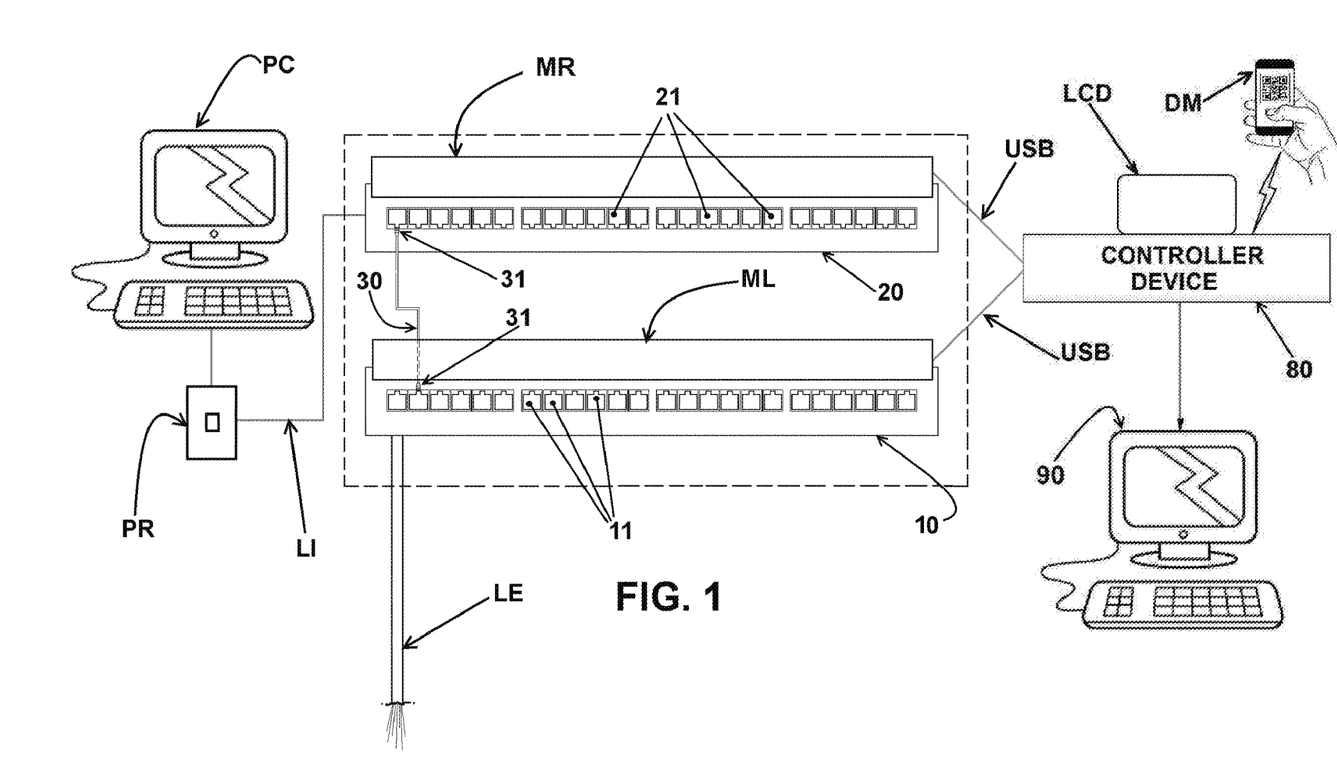
FIG. 1 shows a diagram of the identification system when applied to a set of patch panels exemplified by only two panels, each one carrying 12 RJ-45 type panel ports, only one of the ports of a panel being interconnected to a port on the other panel a patch cord.

As shown in FIG. 1 and already mentioned above, the present disclosure relates to a system for identifying pairs of ports and of the respective patch cords of patch panels of telecommunication networks, of the type comprising a plurality of patch panels 10, 20, which respectively receive external lines LE and internal lines LI, being shown in FIG. 1 only an internal line LI, leaving a patch panel 20 towards a network point PR, for connection of a computer PC of a user, to a port of another connecting panel 10.

The connecting panels 10, 20, are usually mounted on non-illustrated structures, mounted in an adequate enclosure, usually a restricted access room. The number of patch panels may vary according to the needs of each installation, it being understood that the illustrations presented herein are for exemplary purposes only, showing the relationship between a patch panel 10, which mirrors the ports of active telecommunication equipment, and a patch panel 20 from which run the internal lines LI for the different network points PR.

Each patch panel 10, 20 comprises, in its front region, a plurality of panel ports 11, 21, to be interconnected, two by two, in a previously defined arrangement, by a patch cord 30 having, at each end, a connector 31, for example RJ45 type, to be inserted and retained in a respective port 11, 21, of a pair of panel ports to be interconnected.

Each port 11, 21 is connected, through the rear region of the panel, to an equipment port or telecommunications outlet or to another port of another panel.

Figure 2:
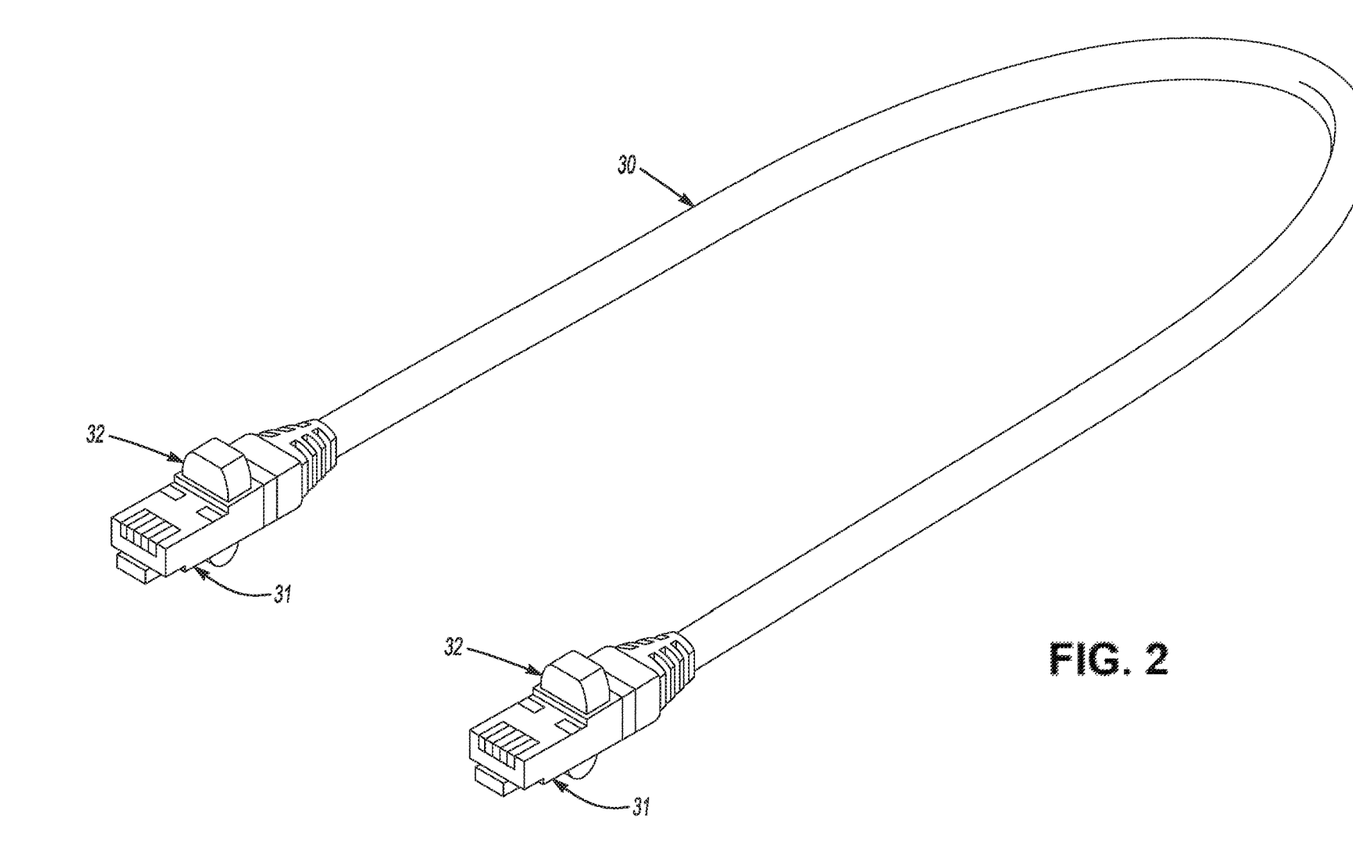
FIG. 2 is a perspective view of a patch cord of the type shown in FIG. 1 and having each of its RJ-45 connectors attaching a passive NFC identification tag containing data identity the respective patch cord.

According to a first aspect of the present disclosure, each connector 31 of a patch cord 30 is constructed to allow that be secured therein, by any suitable connection, an identification tag 32 in the form of a tag containing a small passive electronic memory capable of communicating via radiofrequency (RF), and storing data relating to the individual identification of the respective patch cord 30 at the ends of which the two connectors 31 are adapted, each securing a respective identification tag 32, as shown in FIG. 2.

Thus, the two identification tags 32, associated to each patch cord 30, contain the same individual identification data of the respective patch cord 30. This identification tag 32 does not require additional circuits or external antenna, being totally passive.

The fact that the identification tag 32 proposed by the present disclosure contains a small electronic memory enables a simple and rapid insertion of data into the identification tags 32 already attached to the respective connectors 31 of a patch cord 30, already inserted in respective patch panel ports 11, 21, as discussed more fully herein after.

Figure 3:
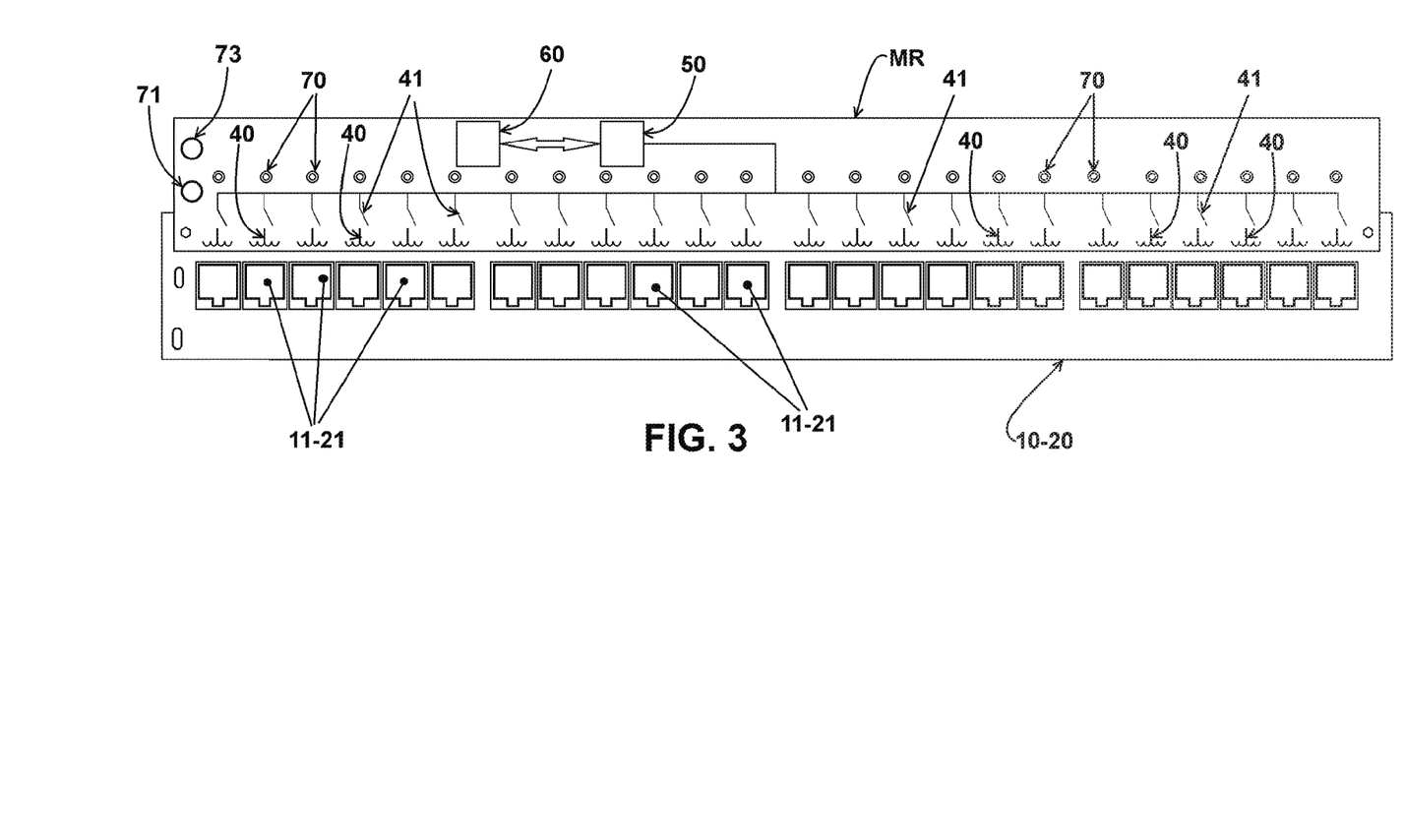
FIG. 3 shows a front view of one of the two patch panels of FIG. 1, illustrating a tracking module, to be removably adapted in each patch panel, for capturing, processing and storing the representative signals of the identification tag of the end connector inserted into a panel port.
Figure 4:
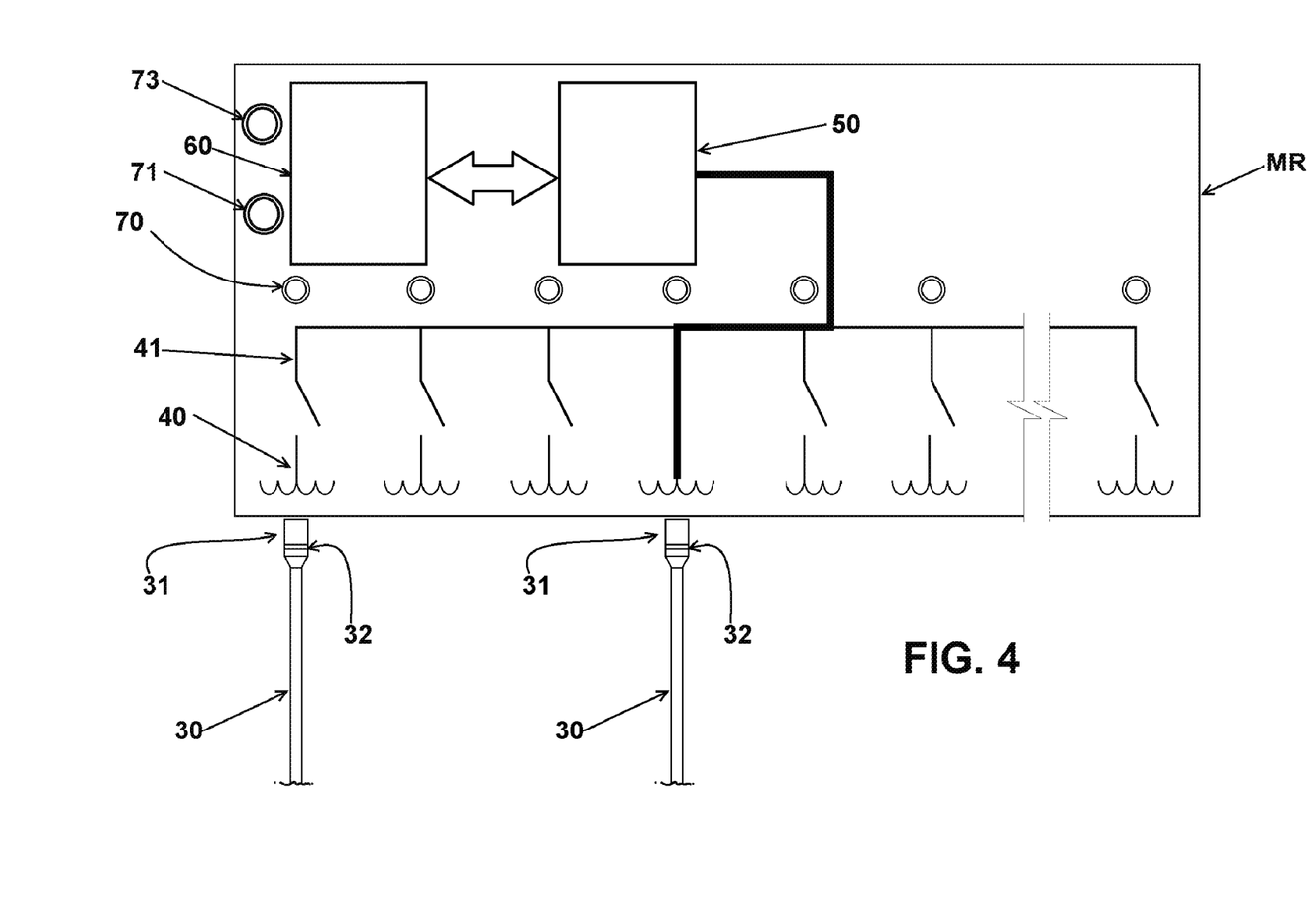
FIG. 4 shows a diagram illustrating the elements of a tracking module carrying an NFC antenna and a light indicator for each port of the respective patch panel, further illustrating one of the switches closed, for connecting the respective antenna to the tracking module reader for capturing, processing and storing the data received from the identification tag of the patch cord connector, which is inserted to the patch panel port.

As shown in FIGS. 1, 3, and 4, the solution proposed by the present disclosure requires that the identification tag 32, of each connector 31 inserted in a port 11, 21, may provide, to a tracking module MR, by wireless communication, signals representative of the identifying data of the patch cord and stored in its electronic memory, so that such data is captured, processed and stored for further tracking process of the interconnections being made or rearranged in the set of patch panels 10, 20.

The tracking module MR is constructed to be installed or removed from each patch panel 10, 20 already mounted on the respective support structures and respectively connected to the telecommunication lines to be interconnected. The attachment of each MR tracking module to the respective patch panel 10,20 can be done in different ways, provided that it does not impair access to the panel ports 11,21 and allows the safe capture, by the MR tracking module, of the identification data contained in the identification tag 32 of the connector 31 inserted in each port 11,21.

As exemplified in FIGS. 3 and 4, each MR tracking module comprises an NFC-type antenna 40, to be positioned adjacent each port 11, 21, of the patch panel 10, 20, the antennas 40 of each MR tracking module being selectively connected, one by one, by respective switches 41, electronically controlled, to a transceiver 50 which is in turn connected to a reader 60 provided with memory and processor for processing the signals which each antenna 40 is able to individually and sequentially receive from the respective identification tag 32 and store said data representative of the identification of the panel ports 11, 21 interconnected by a patch cord 30.

The proposed solution works at the frequency 13.56 MHz, whereby the power required for communication between the identification tag 32 and a respective antenna 40 is lower than that used in a system using RFID, not interfering with other nearby systems to the installation in question.

Figure 5:
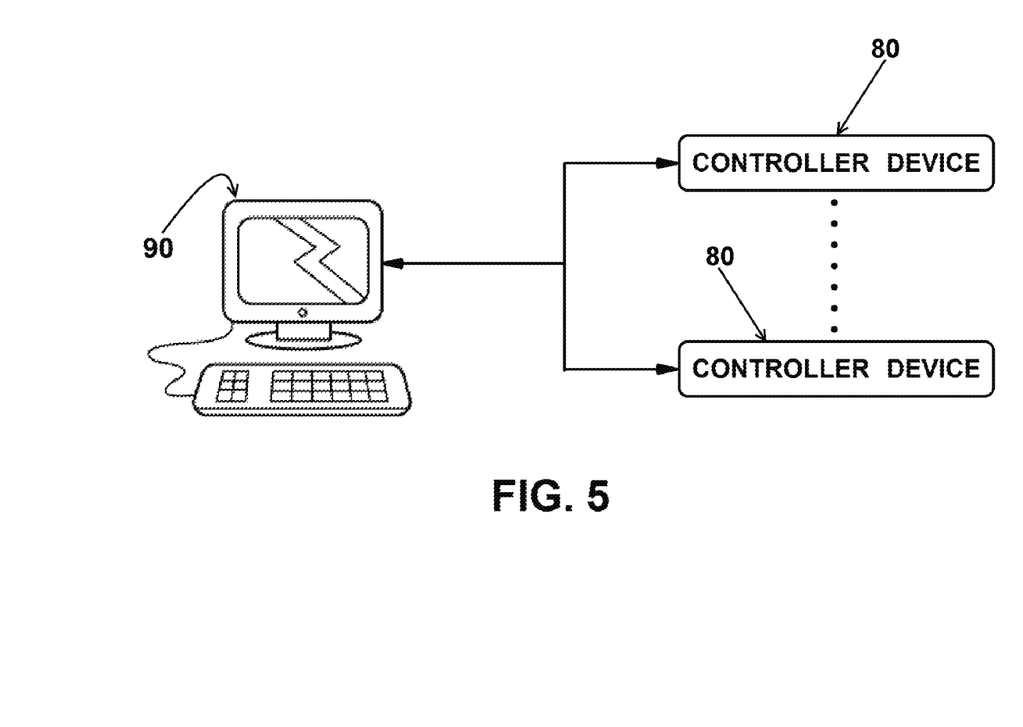
FIG. 5 schematically shows a server provided with management software of "n" control devices of the pairs of patch panels.

Each MR tracking module further comprises light indicators 70, for example in the form of LEDs, to indicate the status of each panel port 11, 21, a light indicator 71 to indicate, with respect to the predetermined arrangement of interconnections, the status of the patch panel 10, 20 to which it is attached, and a button 73 which, when pressed by the operator, performs the initial registration of the panel, in a controller device 80. The controller device 80 maintains a database of the connections of all the panel ports 11, 21 connected thereto and communicates that database to the software of a centralized server 90, as shown in FIGS. 1 and 5. From the database of the controller device 80 it is possible to carry out manual scans of connections through a display (LCD) provided in the controller device 80. This scanning is made by selecting the panel on the LCD display of the controller device 80 and the pressure action in navigation arrows (not shown) causes the light indicators 70 of the MR tracking module to be sequentially energized. At the same time, the controller device 80 queries its database of connections and sends commands to energize the corresponding light indicator 70 of the MR tracking module coupled to the other patch panel 10, 20, making it easy to identify the panel ports related to the same patch cord 30.

The MR tracking modules of the patch panels 10, 20 containing a number of pairs of panel ports 11, 21, for example 24 pairs of ports, are operatively communicated via CAN port and via USB cables, to a respective controller device 80 provided with a persistent flash memory table which is not lost in the event of a power failure in the controller device 80, containing all the information of all the patch cords 30 (register of the serial number of the NFC identification tag 32) which are connected to the panel ports 11, 21 of the patch panels managed by the respective controller device 80. The energization of the constituent elements of each MR tracking module is obtained from the controller device 80.

According to the identification method defined by the operation of the system proposed herein, each MR tracking module sequentially carries out, by its reader 60 and at intervals of, for example, 3 seconds, the reading of the signals picked up by the antennas 40, regardless of the commands of the respective controller device 80. The reader 60 of each MR tracking module identifies which ports of the pairs of the panel ports 11, 21 are connected by a patch cord 30, or which have been disconnected, and stores the status information in its internal memory so that it can be managed by the respective controller device 80 to which the reader 60 is connected by a respective USB cable.

Figure 6:
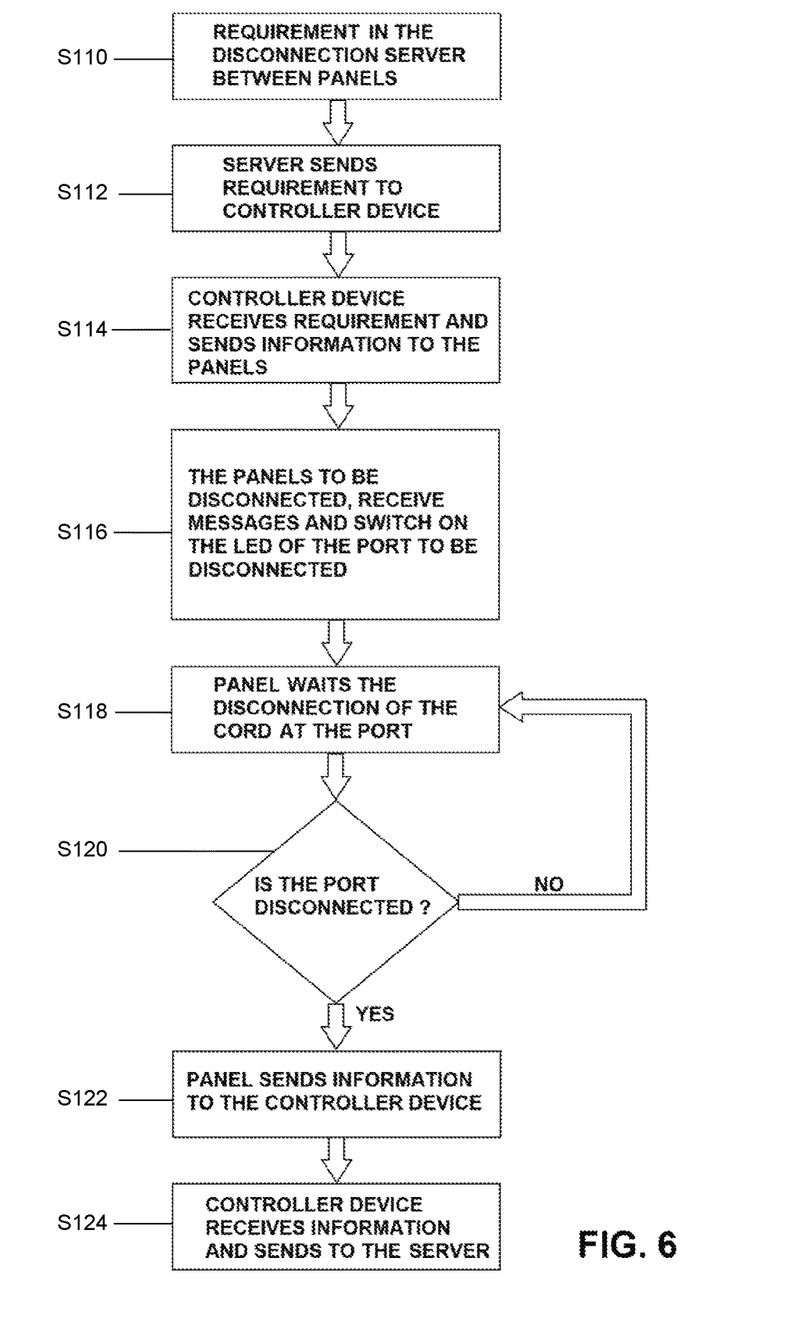
FIG. 6 shows a diagram of the sequence of actions performed by the identification system, upon registration of change of the interconnections by disconnection of patch panel ports.
Figure 7:
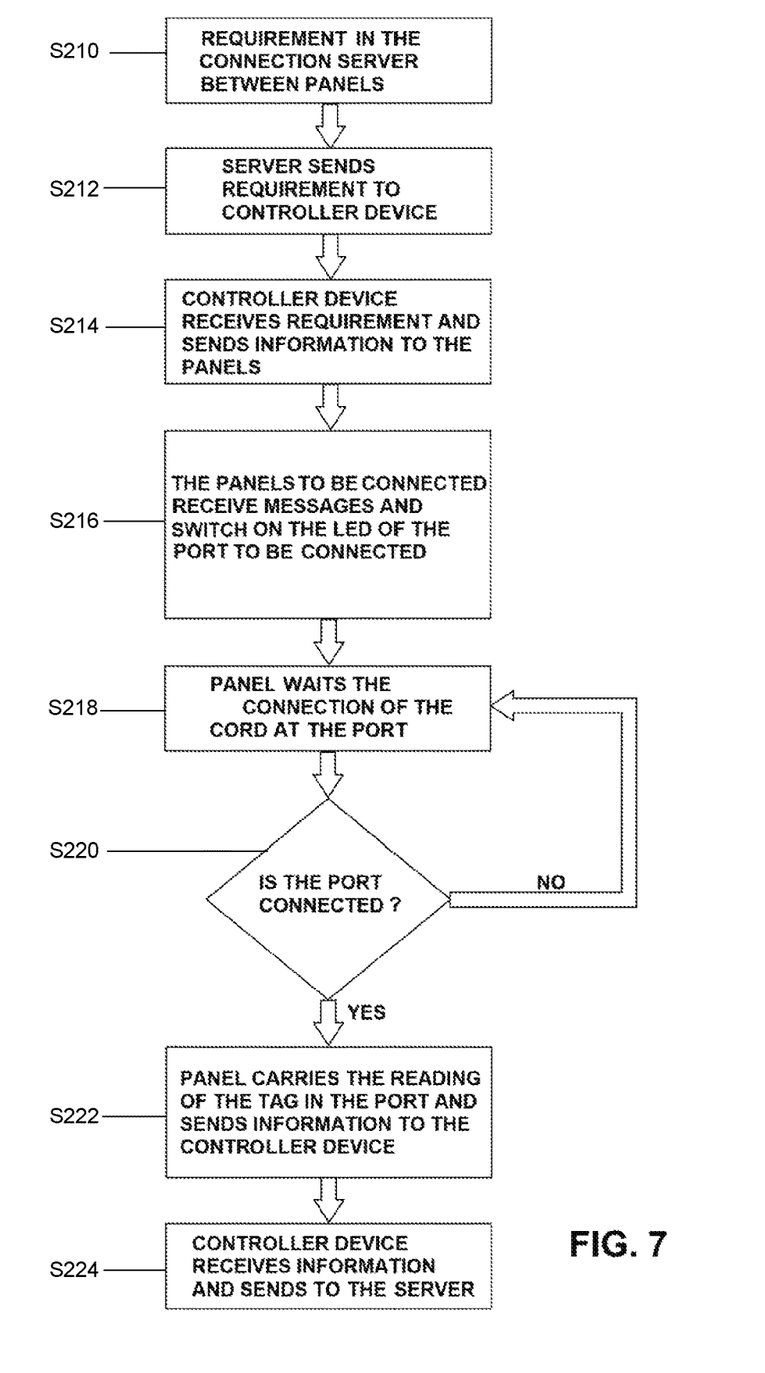
FIG. 7 shows a diagram of the sequence of actions carried out by the identification system, upon registration of change in the interconnections by connection of patch panel ports.

Each controller device 80, operably associated with a number of patch panels 10, 20, for example of 24 pairs of ports, is commanded, via Ethernet port, by software installed on the server 90, which software can manage various controller devices 80, as schematically illustrated in FIG. 5, according to the particular characteristics of each interconnection layout. The usual interconnection layout changes (port connections and disconnections) can be easily upgraded in the software of the server 90, including the insertion of supplementary user identification data into the identification tags 32 of the already installed patch cords 30. FIG. 6 and 7 illustrate the actions of the method of identification effected by the system in question, upon registration of change of interconnections, by disconnection and connection, respectively, of the ports of the patch panels.

FIG. 6 illustrates the method of identification effected by the identification system upon registration of change of connections by disconnection of the ports 11, 21 of the patch panels 10, 20. In step S110, a requirement in the server 90 for the disconnection between panels 10, 20 is made. In step S112, the server 90 sends requirement to the controller device 80. In step S114, the controller device 80 receives the requirement and sends information to the panels 10, 20. In step S116, the panels 10, 20 to be disconnected, receive the message and switch on the indicators 70 (LEDs) of the port 11, 21 to be disconnected. In step S118, the panel 10, 20 waits the disconnection of the cord 30 at the port 11, 21. In step S120, it is determined if the port 11, 21 is disconnected. If it is determined that the port 11, 21 is not disconnected, the method returns to step S118. If it is determined that the port 11, 21 is disconnected, the method proceeds to step S122. In step S122, the panel 10, 20 send information to the controller device 80. In step S124, the controller device 80 receives the information and sends to the server 90.

FIG. 7 illustrates the method of identification effected by the identification system upon registration of change of connections by connection of the ports 11, 21 of the patch panels 10, 20. In step S210, a requirement in the server 90 for the connection between panels 10, 20 is made. In step S212, the server 90 sends requirement to the controller device 80. In step S214, the controller device 80 receives the requirement and sends information to the panels 10, 20. In step S216, the panels 10, 20 to be connected, receive the message and switch on the indicators 70 (LEDs) of the port 11, 21 to be connected. In step S218, the panel 10, 20 waits the connection of the cord 30 at the port 11, 21. In step S220, it is determined if the port 11, 21 is connected. If it is determined that the port 11, 21 is not connected, the method returns to step S218. If it is determined that the port 11, 21 is connected, the method proceeds to step S222. In step S222, the panel 10, 20 carries the reading of the tag 32 in the port 11, 21 and sends information to the controller device 80. In step S224, the controller device 80 receives the information and sends to the server 90.

The energization of the light indicators 70, indicative of the connection status of the panel ports, is done sequentially, one by one, from operator control on the LCD display of the controller device 80 or via application software installed on a mobile device DM to be carried by the operator to indicate to the latter which ports 10, 20 should be interconnected by a respective patch cord 30, in accordance with the updated interconnection layout defined by the software of the server 90, which manages the operation of any of the controller devices 80 operatively associated with the MR tracking modules of the patch panels of the same connectivity area, which is programmed logically to represent a telecommunications room, a floor, a building, etc.

The server 90 allows that "work" orders be programmed, each of these actions defining, in the software of the server 90, which ports 11, 21 of the patch panels manageable by the respective MR tracking module should be communicated or fail to communicate through the patch cords 30. With this, an operator will make the connections between the manageable patch panels 10, 20 by correctly using only the patch cords 30 containing the identification tags 32 compatible with the programmed interconnection layout.

The server 90 has its software programmed to ignore or to block the interconnection by a patch cord 30 between distinct connectivity areas whose interconnection is not permitted by the structured cabling standards.

In addition to the above, the server 90 should be programmed so that the controller devices 80 of the same connectivity area block the simultaneous scanning of the light indicators 70, making it possible to start said scanning of a patch panel 10, 20 within said connectivity area and when there is no "work order" being executed in this connectivity area.

If there is a "work order" being performed, the controller devices 80 should block the scanning of the light indicators 70. In the event of a scan in a connectivity area and a "work order" execution is initiated, the scan is closed until the execution of the "work order" is completed.

In the event of an identification tag 32 is disconnected from the local (internal) or remote (external) side during a scanning operation, the controller device 80 should erase the remote side and keep its light indicator 70 on (energized) of the local side of adaptation of the patch cord 30, wherein the controller devices 80 of that connectivity area and the software of the server 90 should receive an instruction to update the layout of interconnections and issue alerts to the administrator.

If occurs a connection of identification tag 32 at the local side (internal) or remote side (external) coincident with a port which is the light indicator 70 energized and representing one end of a patch cord 30 with the other end already inserted, the controller devices 80 of said connectivity area and also the software of the server 90 should perform the energization of the corresponding light indicator 70 and update the interconnection layout of the respective connectivity area and issue alerts to the administrator.

The controller device 80 should operate autonomously if it is not inserted in any connectivity area or if it has not yet been connected to the server 90. In that condition, the controller device 80 should control, by interconnect layouts, the connections executed in the patch panels 10, 20 previously recorded in the controller device 80, enabling scanning operations of the light indicators 70.

While shown herein are panel ports 11, 21 designed to receive connectors 31 of the RJ45 standard, it should be understood that such ports may be configured in accordance with other designs to receive different types of connectors 31 not necessarily represented by the RJ45 standard. For example, connectors for fiber optic cables in SC, LC or other standards, connectors used in telephony, in industrial or building automation systems, etc., may be used.

It is claimed:

1. A system for identification of pairs of ports and of respective patch cords in patch panels of telecommunication networks, each patch cord having opposite ends each one carrying a respective connector to be removably inserted and retained in a respective port of a respective patch panel, each connector of a same patch cord carrying an identification tag containing, stored therein, a unique identity of the respective patch cord, the identification tag is of a passive NFC type, each patch panel removably fixing a tracking module connected to a controller device and the tracking module comprising:
   a NFC antenna associated with each port of each panel;
   a transceiver;
   a switch selectively connecting, one by one, each NFC antenna to the transceiver;
   a reader connected to the transceiver and processing and storing the signals that each NFC antenna picks up from the identification tag, of a connector inserted in the respective panel port, said signal containing a connection/disconnection identification, associated to the panel port;
   a light indicator associated with each port and indicating a connection status of each port; and
   a button to register the patch panel in the controller device, the transceiver, the reader, the switches, the light indicators and the button of each patch panel of a set of pairs of patch panels energized and operated from the respective controller device having its operation managed, according to a programmed interconnection layout, by a server.

2. The system according to claim 1, wherein the reader of each tracking module performs, sequentially and at regular intervals, the reading of the signals picked up by the NFC antennas, independently of the commands of the respective controller device.

3. The system according to claim 1, further comprising a display and/or a mobile device operatively associated with a respective controller device and controlled by an operator to provide a sequential energization, one by one, of the light indicators of each pair of panel ports to be interconnected by a respective patch cord according to the interconnection layout defined by the server.

4. The system according to claim 1, wherein each tracking module carries a respective light indicator operatively associated with a respective controller device and energized upon registration of the respective patch panel in the interconnection layout programmed in the server.

5. The system according to claim 1, wherein each controller device is operatively associated with the button to register, by an actuation of the button, the status of connection between two panel ports by a sequential energization of each light indicator of a respective tracking module and the corresponding light indicator of the tracking module of the other patch panel and related to a panel port associated with the same patch cord.

6. The system according to claim 1, wherein each controller device is operatively associated with a set of pairs of patch panels comprising a multiplicity of pairs of panel ports to be connected to each other by respective patch cords.

7. The system according to claim 1, wherein each controller device is provided with a table, which is persistent in flash memory and contains all information of all the patch cords contained in the respective pairs of identification tags of connectors that are connected to the panel ports of the patch panels managed by the respective controller device.

8. The system according to claim 1, wherein each controller device has its operation managed in accordance with the characteristics of each interconnection layout and via an internet port connection, by a software installed in the server.

9. The system according to claim 1, wherein the server manages the operation of the controller devices associated with the patch panels of the same connectivity area, logically programmed, to represent a telecommunications enclosure.

10. The system according to claim 9, wherein the server is programmed to ignore or to block an interconnection via a patch cord between distinct connectivity areas.

11. The system according to claim 10, wherein the server is programmed so that the controller devices of the same connectivity area block the simultaneous reading of the light indicators, releasing said reading of a patch panel within said connectivity area when there is no "work order" execution in that connectivity area.

12. The system according to claim 1, wherein the controller device can function autonomously when not inserted in any connectivity area or not connected to the server.

13. The system according to claim 2, further comprising a display and/or a mobile device operatively associated with a respective controller device and controlled by an operator to provide a sequential energization, one by one, of the light indicators of each pair of panel ports to be interconnected by a respective patch cord according to the interconnection layout defined by the server.

14. The system according to claim 2, wherein each tracking module carries a respective light indicator operatively associated with a respective controller device and energized upon registration of the respective patch panel in the interconnection layout programmed in the server.

15. The system according to claim 3, wherein each tracking module carries a respective light indicator operatively associated with a respective controller device and energized upon registration of the respective patch panel in the interconnection layout programmed in the server.

16. The system according to claim 13, wherein each tracking module carries a respective light indicator operatively associated with a respective controller device and energized upon registration of the respective patch panel in the interconnection layout programmed in the server.

17. The system according to claim 2, wherein each controller device is operatively associated with the button to register, by an actuation of the button, the status of connection between two panel ports by a sequential energization of each light indicator of a respective tracking module and the corresponding light indicator of the tracking module of the other patch panel and related to a panel port associated with the same patch cord.

18. The system according to claim 3, wherein each controller device is operatively associated with the button to register, by an actuation of the button, the status of connection between two panel ports by a sequential energization of each light indicator of a respective tracking module and the corresponding light indicator of the tracking module of the other patch panel and related to a panel port associated with the same patch cord.

19. The system according to claim 4, wherein each controller device is operatively associated with the button to register, by an actuation of the button, the status of connection between two panel ports by a sequential energization of each light indicator of a respective tracking module and the corresponding light indicator of the tracking module of the other patch panel and related to a panel port associated with the same patch cord.

20. A system for identification of a pairs of ports in patch panels of telecommunication networks, the system comprising:
- patch cords configured to be connected to the pairs of ports in the patch panels, each patch cord having opposite ends, each end carrying a respective connector to be removably inserted and retained in a respective port of a respective patch panel, each connector of a same patch cord carrying a passive NFC type identification tag containing, stored therein, a unique identity of the respective patch cord; and
- a tracking module removably fixed to each patch panel, each tracking module connected to a controller device, the tracking module comprising:
  - a NFC antenna associated with each panel port;
  - a transceiver;
  - a switch selectively connecting, one by one, each NFC antenna to the transceiver;
  - a reader connected to the transceiver and processing and storing the signals that each NFC antenna picks up from the identification tag, of a connector inserted in the respective panel port, said signal containing a connection/disconnection identification, associated to the panel port;
- a light indicator associated with each port and indicating a connection status of each port; and
- a button to register the patch panel in the controller device, the transceiver, the reader, the switches, the light indicators and the button of each patch panel of a set of pairs of patch panels energized and operated from the respective controller device having its operation managed, according to a programmed interconnection layout, by a server.

* * * * *

UNITED STATES PATENT AND TRADEMARK OFFICE
CERTIFICATE OF CORRECTION

PATENT NO. : 10,484,306 B2  
APPLICATION NO. : 16/156713  
DATED : November 19, 2019  
INVENTOR(S) : Scarpin et al.

Page 1 of 1

It is certified that error appears in the above-identified patent and that said Letters Patent is hereby corrected as shown below:

On the Title Page

Insert (30) Foreign Application Priority Date:  
--October 10, 2017 (BR) ............. 1020170218686--

Signed and Sealed this  
Twenty-ninth Day of March, 2022

Drew Hirshfeld  
*Performing the Functions and Duties of the*  
*Under Secretary of Commerce for Intellectual Property and*  
*Director of the United States Patent and Trademark Office*